(12) United States Patent
Hynecek et al.

(10) Patent No.: US 6,323,479 B1
(45) Date of Patent: Nov. 27, 2001

(54) SENSOR PIXEL WITH LINEAR AND LOGARITHMIC RESPONSE

(75) Inventors: Jaroslav Hynecek, Richardson, TX (US); Eric C. Fox; Douglas R. Dykaar, both of Waterloo (CA)

(73) Assignee: Dalsa, Inc., Waterloo (CA)

( * ) Notice: Subject to any disclaimer, the term of this patent is extended or adjusted under 35 U.S.C. 154(b) by 0 days.

(21) Appl. No.: 09/393,313

(22) Filed: Sep. 10, 1999

Related U.S. Application Data

(60) Provisional application No. 60/100,556, filed on Sep. 16, 1998.

(51) Int. Cl.⁷ .................................................. N01L 31/14
(52) U.S. Cl. ............................. 250/214 L; 250/208.1; 348/308
(58) Field of Search ............................. 250/208.1, 214 L; 348/308

(56) References Cited

U.S. PATENT DOCUMENTS

| | | |
|---|---|---|
| 3,770,967 | 11/1973 | Hanna et al. . |
| 3,770,968 | 11/1973 | Hession et al. . |
| 4,794,247 | 12/1988 | Stineman, Jr. . |
| 5,296,697 | 3/1994 | Moses, Jr. . |
| 5,608,204 | 3/1997 | Hofflinger et al. . |
| 5,742,047 | 4/1998 | Buhler et al. . |
| 6,191,408 * | 2/2001 | Shinotsuka et al. .............. 250/208.1 |

OTHER PUBLICATIONS

Savvas G. Chamberlain, et al., "A Novel Wide Dynamic Range Silicon Photodetector And Linear Imaging Array", IEEE Journal Of Solid–State Circuits, vol. SC–19, No. 1, Feb. 1994, pp. 41–48.

W. D. Washkurak et al., "A Floating Gate Wide Dynamic Range Photodetector", Dalsa, Mar. 1994, pp. 2–34.

* cited by examiner

*Primary Examiner*—Stephone B. Allen
(74) *Attorney, Agent, or Firm*—Dorsey & Whitney LLP

(57) ABSTRACT

A pixel includes a photon detecting element coupled between a node and a ground, a transistor structure coupled between the node and a first predetermined voltage to provide a logarithmic response region, and a reset transistor coupled between the node and a second predetermined voltage to provide a linear response region where the second predetermined voltage is greater than the first predetermined voltage.

15 Claims, 7 Drawing Sheets

LINEAR-LOG PIXEL | READOUT

SENSOR PIXEL WITH LINEAR AND LOGARITHMIC RESPONSE

Benefit of the Sep. 16, 1998 filing date of provisional application Ser. No. 60/100,556 is hereby claimed.

BACKGROUND OF THE INVENTION

1. Field of the Invention

The present invention relates to a pixel sensor that has a linear response to low light intensity and a logarithmic response to high light intensity. In particular, the invention relates to the use of a reset gate to pre-bias an accumulation node of the pixel so as to cut-off current through a logarithmic response transistor and thereby provide a linear response region.

2. Description of Related Art

A standard log response pixel is based on the notion of sub-threshold conduction. In FIG. 7, a gate of the field effect transistor (FET), denoted $Q_1$, is connected to a first predetermined potential, denoted $V_{DD}$. In this configuration, the voltage at node 1, denoted ①, will have a logarithmic dependence on a photon-induced signal current from the photo-diode. In practice, the voltage output to the readout portion tracks the input illumination and thus this pixel does not require a reset FET. The equivalent resistance through the FET denoted $Q_1$ permits charge to build up and diminish on the parasitic capacitance at node 1 (e.g., due to readout structure). This design achieves a dynamic range of many orders of magnitude. Since the human eye has the same or similar log response, the log response of the pixel is a desired characteristic in electronic vision systems.

In FIG. 8, another known log pixel (referred to as the Chamberlain pixel) connects the gate of transistor $Q_1$, to the transistor's source (instead of its drain). See Chamberlain and Lee, "A Novel Wide Dynamic Range Silicon, Photodetector and Linear Image Array", *IEEE Journal Of Solid-State Circuits*, Volume SC-19, No. 1, February 1984, pages 41–48. This pixel works on a sub-threshold logarithmic voltage response to current, and it is described in U.S. Pat. No. 4,473,836 granted to Chamberlain, incorporated herein by reference.

In FIG. 9 and in U.S. Pat. No. 4,794,247 to Stineman, Jr. there is disclosed photo-diode 201 coupled to integrating amplifier 203, 230 with reset transistor 202 to preset the integration constant. However, this pixel does not include a transistor in series with photo-diode 201 to provide the pixel with a log response region.

In FIG. 10 and in U.S. Pat. No. 5,742,047 to Buhler, et al. there is disclosed a photo-diode D1 coupled to a diode reset transistor M1 and, through a pass transistor M2, coupled to a "fat zero" transistor M3 where an integration node is at the junction between M2 and M3. However, this pixel does not include a transistor in series with photo-diode 201 to provide the pixel with a log response region.

The pixel of FIG. 7 or FIG. 8 typically produce signal swings (in response to light to dark swings) in the order of 100 millivolts. With such small signals, it is difficult to distinguish photon induced signals from dark current and other noise signals, and therefore, it is difficult to achieve high signal to noise sensors, especially a low light levels.

Furthermore, the signal response time to a photon signal input can be long, especially at low light levels where the photo-current is small. The effective resistance across the FET is large at low light levels, and the time constant to achieve equilibrium of the voltage stored on the parasitic capacitance at node 1 is long. This leads to an image lag phenomenon called ghosting (e.g., where a brightly illuminated pixel takes a prolonged time to output a dark signal when the bright illumination is removed).

SUMMARY OF THE INVENTION

It is an object to the present invention to provide a pixel with linear response and logarithmic response regions. It is a further object to provide a pixel with a high speed response to light in the linear response region. It is a further object to provide a pixel with an increased output signal swing in the logarithmic response region.

These and other objects are achieved in a pixel that includes a photon detecting element coupled between a node and a ground, a transistor structure coupled between the node and a first predetermined voltage to provide a logarithmic response region, and a reset transistor coupled between the node and a second predetermined voltage to provide a linear response region where the second predetermined voltage is greater than the first predetermined voltage.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
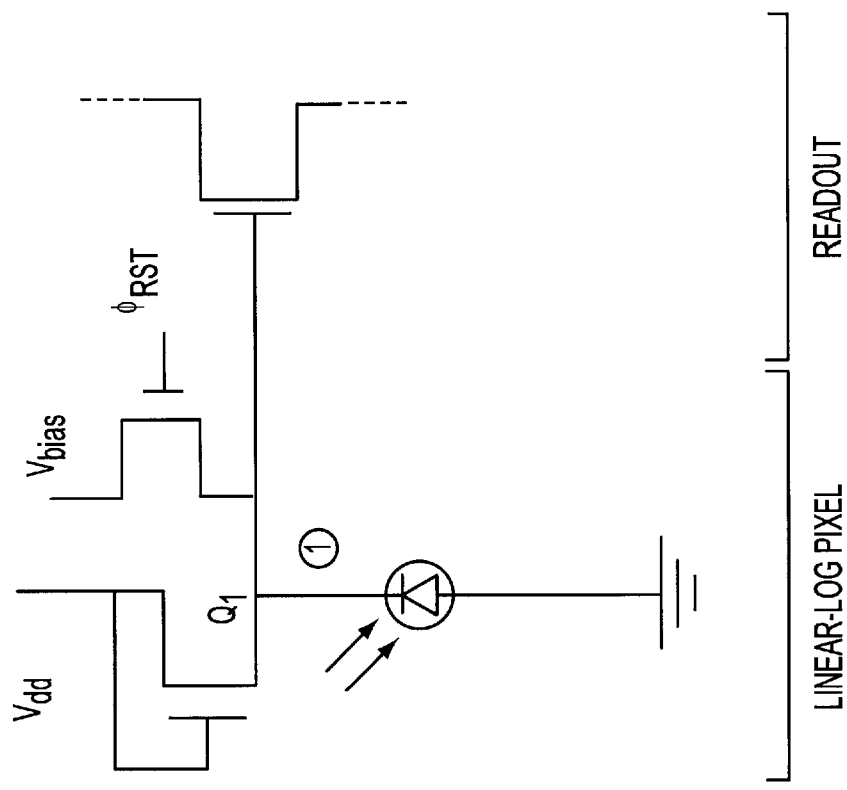
FIG. 1 is a schematic diagram of a pixel according to the present invention.

In FIG. 1, an improved pixel includes a photon detecting element coupled between node 1 and a ground, a log transistor (FET $Q_1$) coupled between node 1 and a first predetermined voltage (denoted $V_{DD}$) and a reset transistor coupled between node 1 and a second predetermined voltage (denoted $V_{BIAS}$). The photon detecting element is preferably a reverse biased photo-diode formed of an n type region in a p type substrate although a photo-gate could be used, and the whole pixel is preferably formed using processes compatible with CMOS processes for ease of manufacture. The reset transistor has a gate coupled to a reset clock, denoted $\phi_{RST}$. The second predetermined voltage $V_{BIAS}$ is greater than (e.g., more positive than) the first predetermined voltage $V_{DD}$ (to which transistor $Q_1$ is connected).

In operation, when reset clock $\phi_{RST}$ is clocked high (to turn on the reset transistor), node 1 becomes biased to a voltage that is greater (more positive) than the voltage required for sub-threshold conduction across FET $Q_1$. In such biased condition, photo-current produced by tile photon detecting element (e.g., photo-diode) will accumulate on the parasitic capacitance at node 1 to cause the voltage on node 1 to drop linearly (become more negative due to accumulation of electrons) until the voltage on node 1 reaches a point where sub-threshold conduction begins to occur across FET $Q_1$. After sub-threshold conduction in FET $Q_1$ begins to occur, the voltage on node 1 will drop logarithmically, and the voltage will reach an equilibrium when the current through FET $Q_1$ is equal to the current through the photon detecting element (e.g., a photo-diode).

Figure 2:
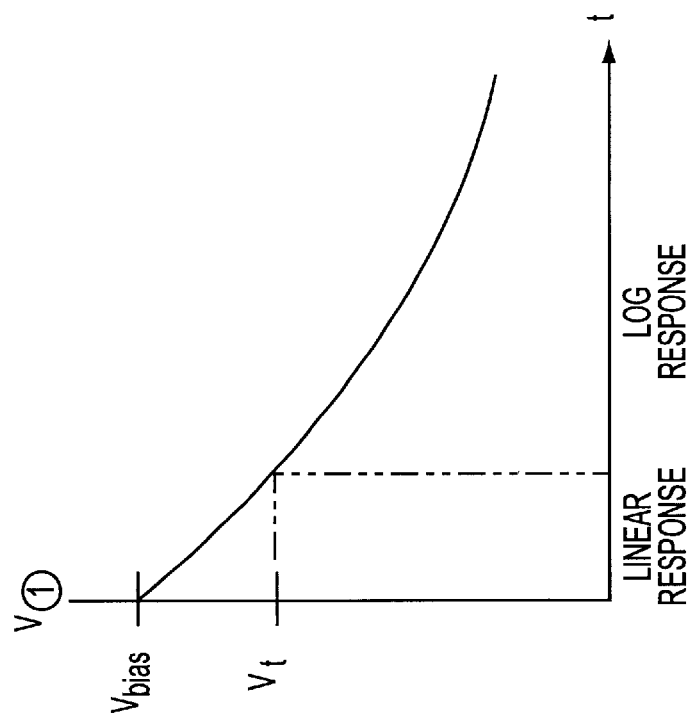
FIG. 2 is a graph showing the output time response of the pixel of FIG. 1.

The pixel just described will exhibit a linear range while FET $Q_1$ is operating at a drain to source voltage that will not support sub-threshold conduction, and a logarithmic range after sub-threshold conduction begins. FIG. 2 is a graph of the pixel's time response to illumination showing the voltage on node 1 initially set to $V_{BIAS}$ and then, as photo-electrons accumulate on node 1, the voltage becomes more negative and reduces linearly until sub-threshold conduction begins to occur in FET $Q_1$ when the voltage on node 1 reaches $V_T$. At this point, conduction in the FET produces the logarithmic response for node voltages that are less than $V_T$. In the linear region, the charge accumulates at a faster rate compared to known log pixels since charge accumulation is no longer limited by the sub-threshold conduction of the FET, but is now controlled by the "on" resistance of the reset FET. Also, the linear region can be adjusted by adjusting the offset between $V_{DD}$ and $V_{BIAS}$, the larger the offset the wider will be the linear region.

In a variant of the above described pixel, the gate of transistor Q. is connected to another predetermined voltage that defines the voltage threshold $V_T$. In another variant of the above described pixel, the gate of transistor $Q_1$ is connected to the transistor's source as in a Chamberlain pixel.

Figure 3:
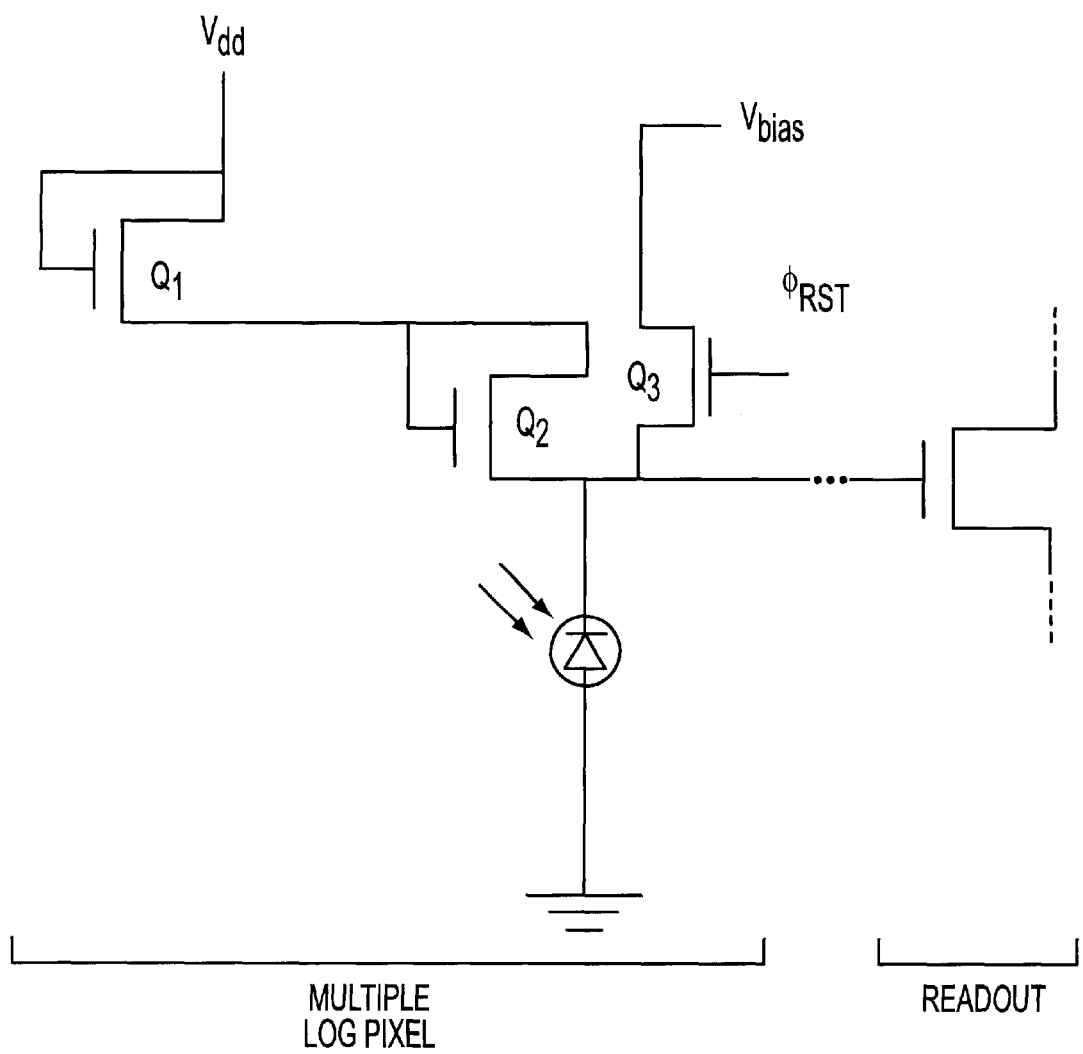
FIG. 3 is a schematic diagram of a variant of the pixel of FIG. 1 with two log transistors biased at their respective drains.

Increased output signal swing in the logarithmic region is achieved by adding additional FETs in series to the single FET $Q_1$ that is illustrated in FIG. 1. In FIG. 3, the drain of transistor $Q_1$ is connected to the source of transistor $Q_2$, and the drains of each transistor are connected to their respective gates. The photo-current produced at the source of transistor $Q_2$ must flow through both transistors. If the voltage, swing across one transistor is a given voltage (e.g., 100 millivolts), then the voltage swing across both transistors is about twice that given voltage. To a first approximation, the signal swing for N stages will be N times as large as the signal swing for a single stage. However, because a dc voltage at the source of each of the transistors will be approximately $V_T$ lower than the voltage at the drain of the respective transistors, the number of stages is limited to approximately $V_{DD}/V_T$. The use of the reset FET and the adjustment of $V_{BIAS}$ can be used no matter how many stages in the logarithmic FET structure.

Figure 4:
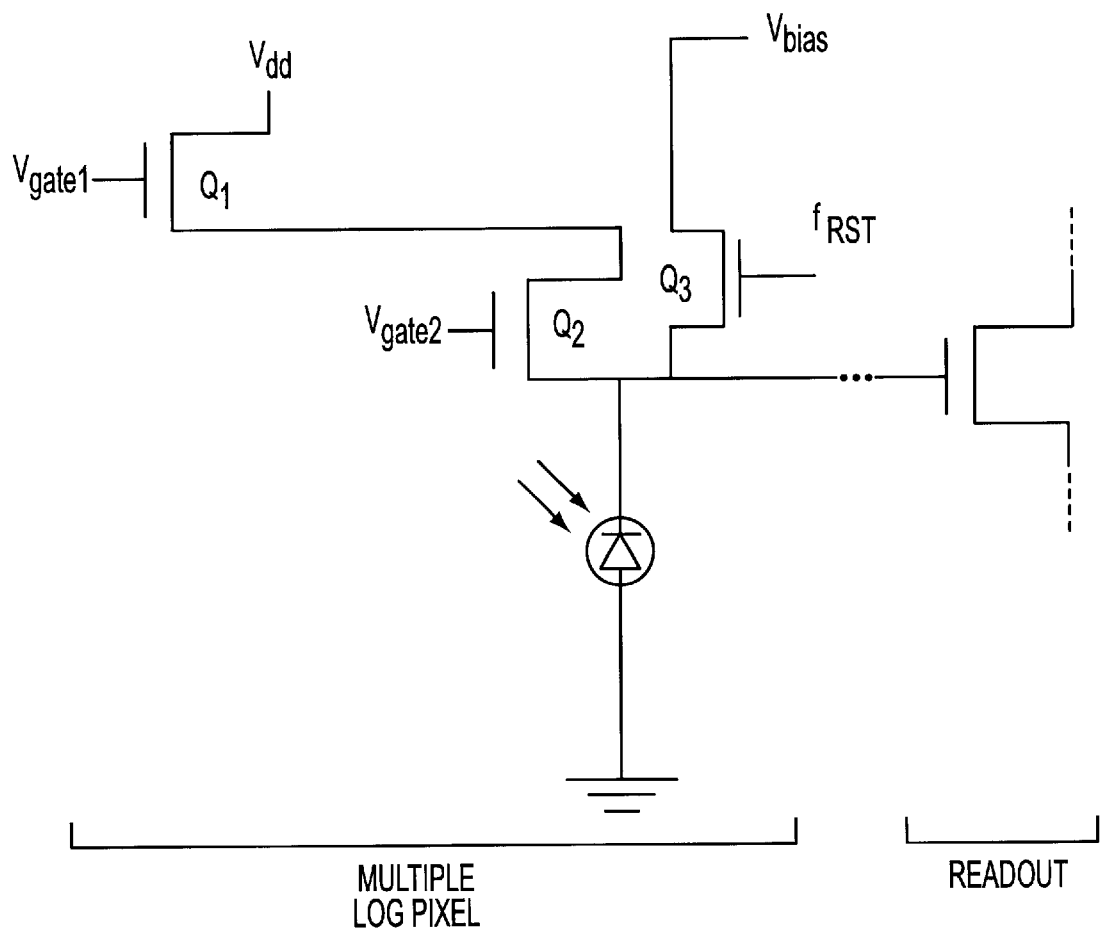
FIG. 4 is a schematic diagram of another variant of the pixel of FIG. 1 with two log transistors biased by fixed potentials.
Figure 5:
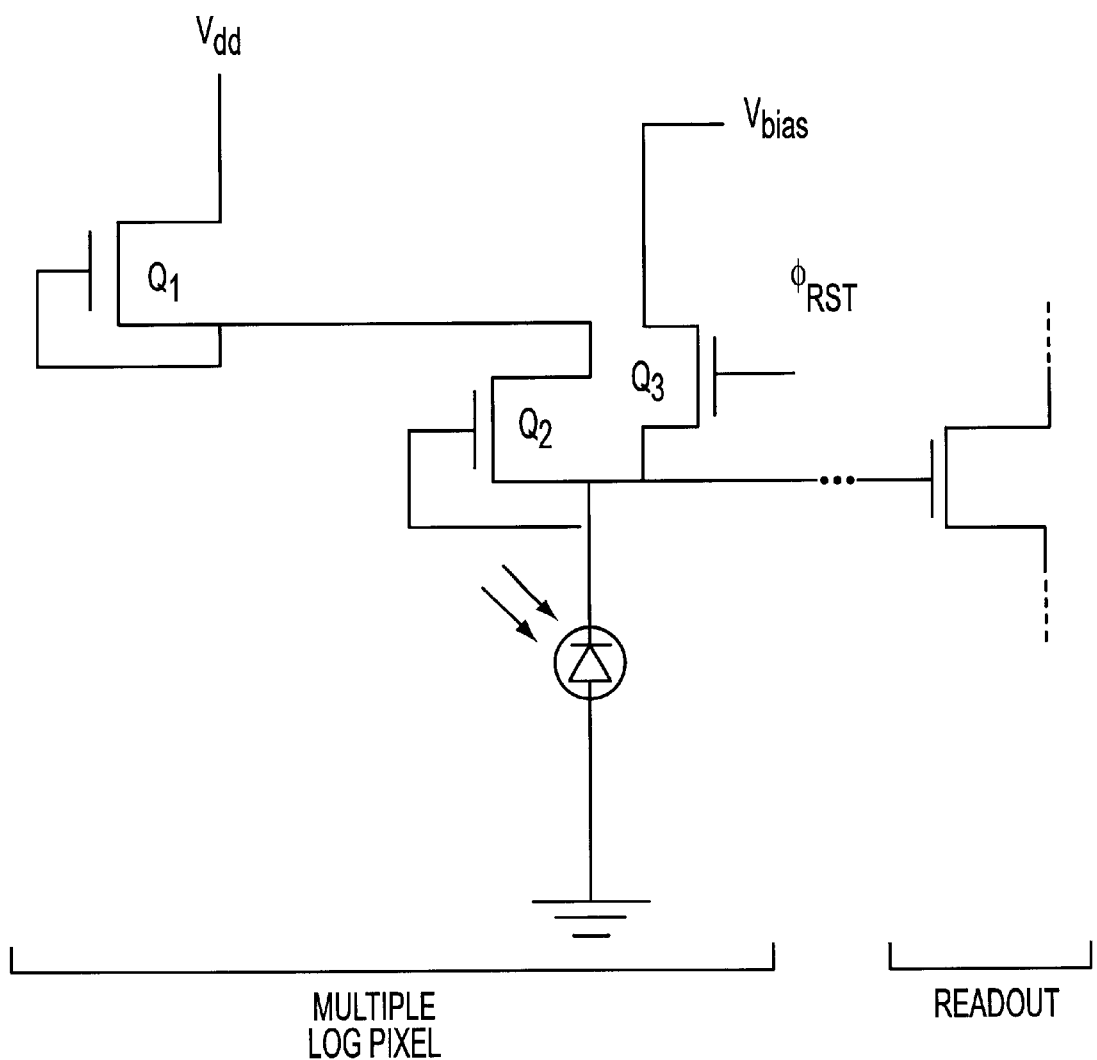
FIG. 5 is a schematic diagram of yet another variant of the pixel of FIG. 1 with two log transistors biased at their respective sources.

In FIG. 4, a variant of the multi-FET pixel is shown in which the drain of transistor $Q_1$ is connected to the source of transistor $Q_2$, and the drains of each transistor are connected to respective predetermined voltages $V_{GATE1}$ and $V_{GATE2}$. In FIG. 5, another variant of the multi-FET pixel is shown in which the drain of transistor $Q_1$ is connected to the source of transistor $Q_2$ and the sources of each transistor are connected to its respective gate (e.g., a variant to the Chamberlain pixel).

Figure 6:
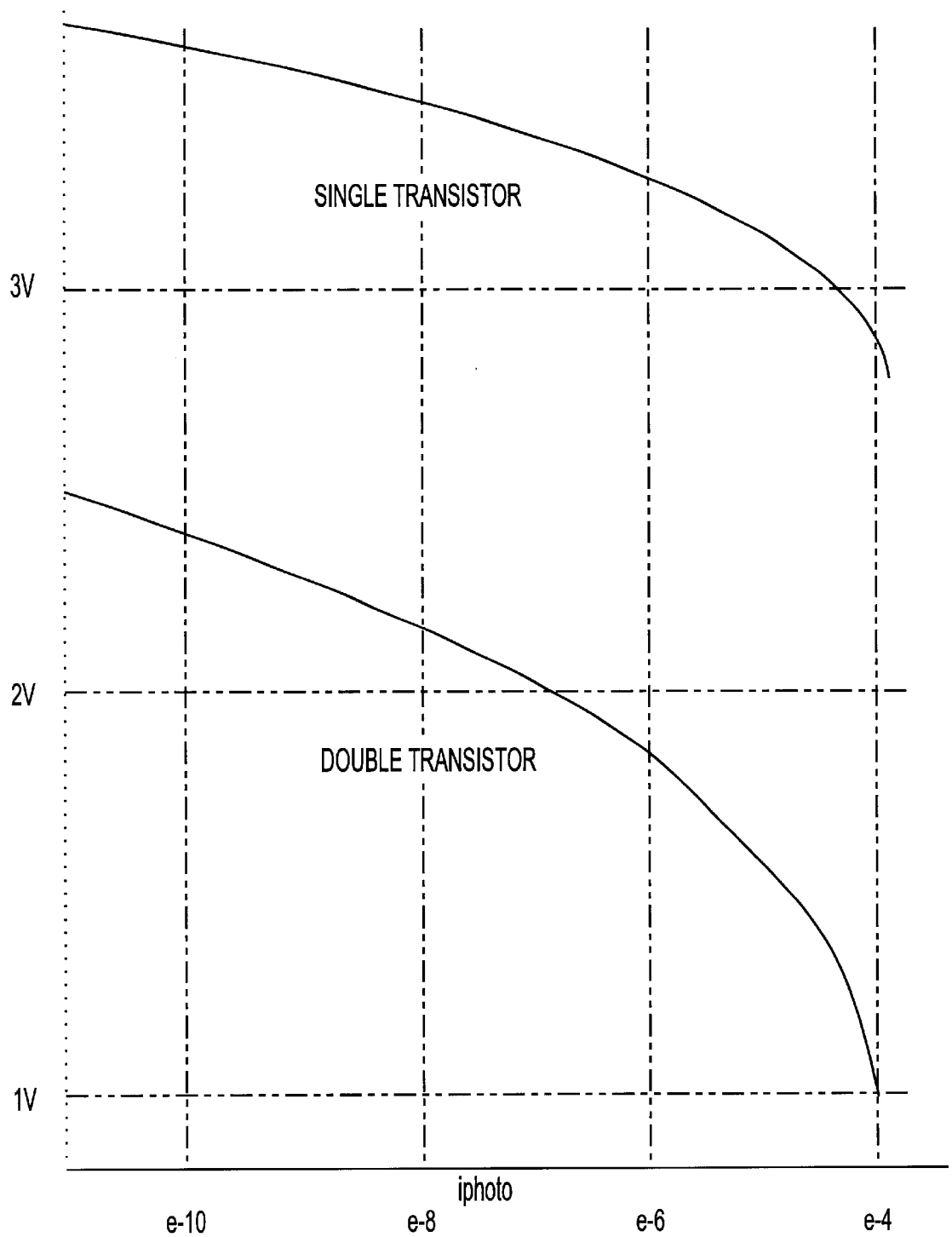
FIG. 6 is a graph showing the output voltage swing of a one and two transistor variant of the pixel of FIG. 1.
Figure 8:
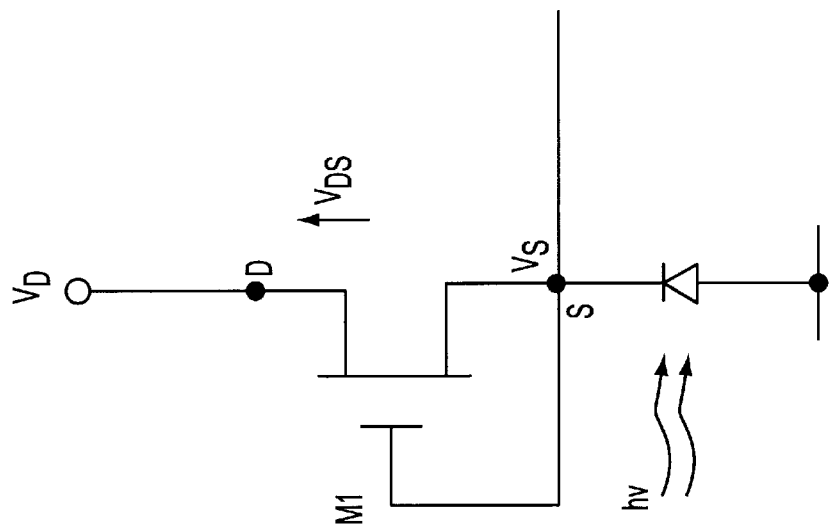
FIGS. 7 and 8 are schematic diagrams of known log pixels.
Figure 7:
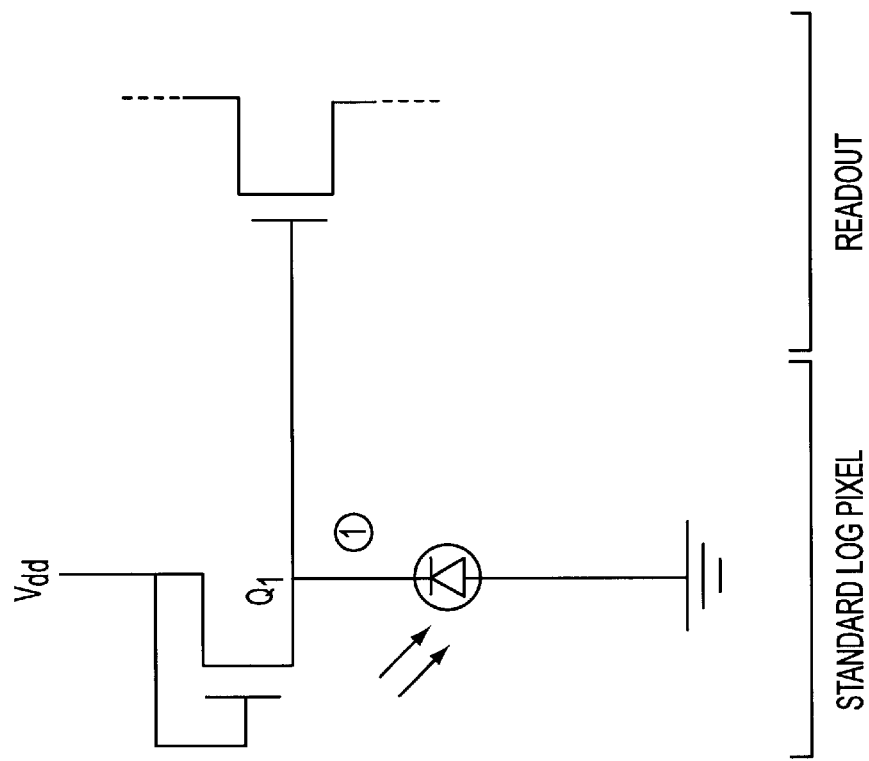
Figure 9:
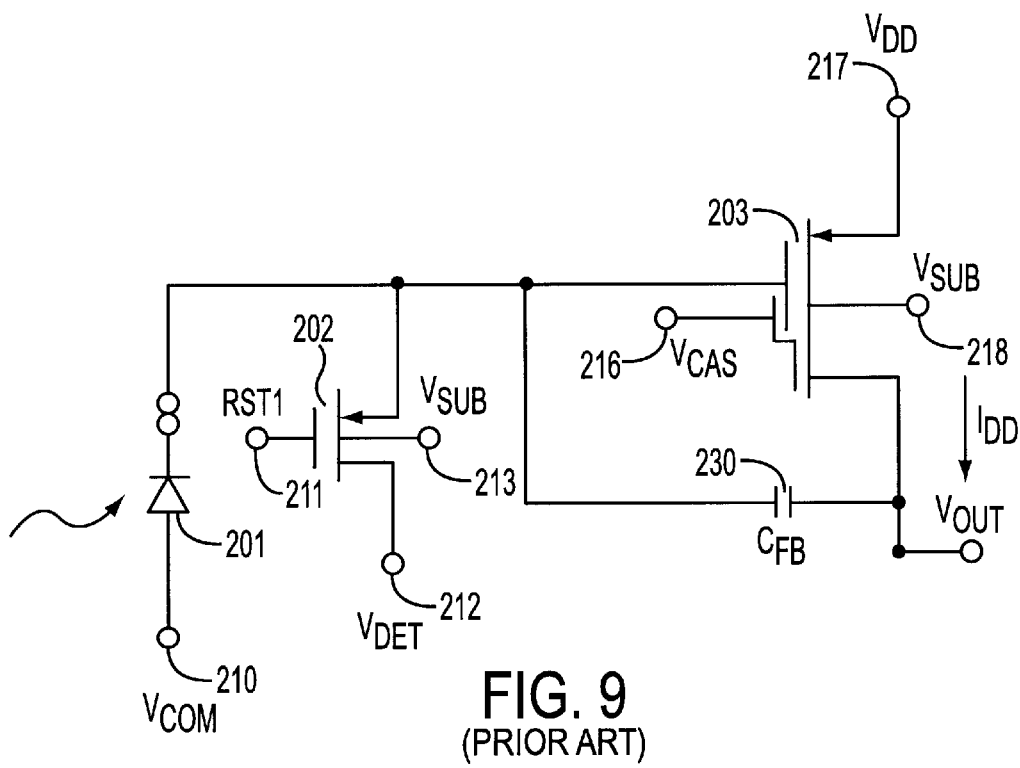
FIGS. 9 and 10 are schematic diagrams of known pixels with reset transistors.
Figure 10:
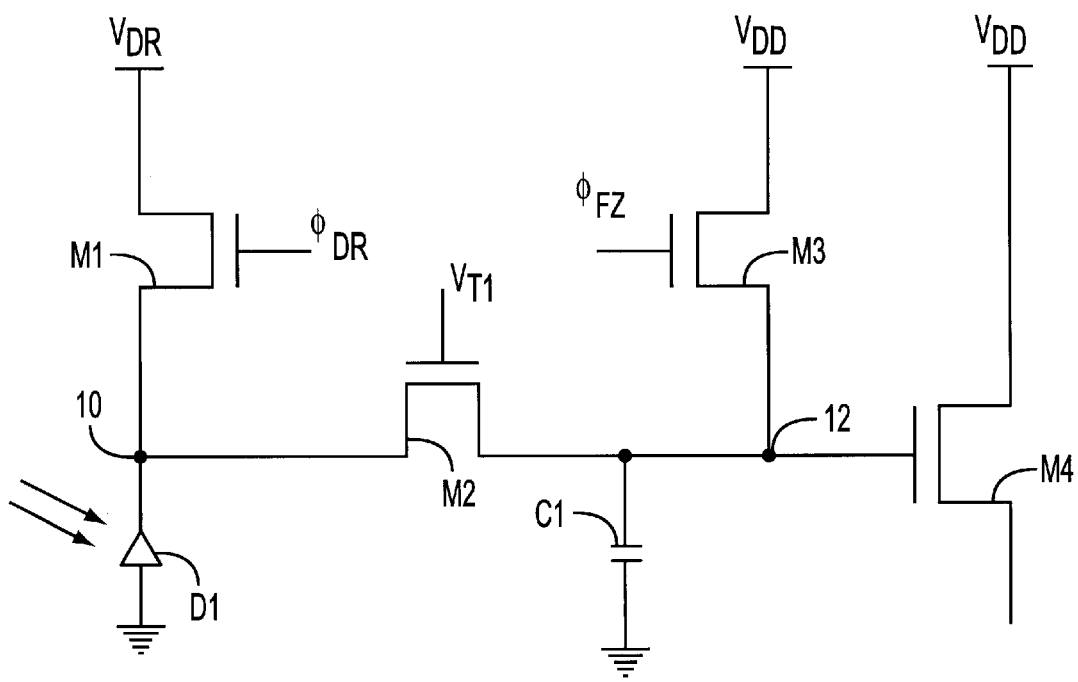

In FIG. 6, a graph is shown of a simulation result showing the response of the voltage output as a function of photo-current for the one log transistor structure depicted in FIG. 1 and the two log transistor structure depicted in FIG. 3. The horizontal axis is the photo current from the photo-diode in Amperes ranging from 0.0001 micro Amperes (a low light condition) to 100 micro Amperes (a bright condition). The voltage swing for the single log transistor over this range of light is about three-quarters of a volt, but the voltage swing for the two log transistors over this range of light is about a volt and a half. This illustrates that the output voltage swing of the two transistor design is about twice that of the one transistor design.

Having described preferred embodiments of a novel sensor pixel with linear response and logarithmic response regions (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by letters patent is set forth in the appended claims:

What is claimed is:

1. A pixel comprising:

a photon detecting element coupled between a node and a ground;

a transistor structure coupled between the node and a first predetermined voltage to provide a logarithmic response region; and a reset transistor coupled between the node and a second predetermined voltage to provide a linear response region, the second predetermined voltage being greater than the first predetermined voltage.

2. The pixel of claim 1, wherein the pixel transistor structure includes an MOS transistor having a gate coupled to the first predetermined voltage.

3. The pixel of claim 1, wherein the pixel transistor structure includes an MOS transistor having a gate coupled to the node.

4. The pixel of claim 1, wherein the pixel transistor structure includes an MOS transistor having a gate coupled to a third predetermined voltage.

5. The pixel of claim 1, wherein the pixel transistor structure includes plural MOS transistors connected in series, each transistor having a respective gate coupled to a respective drain.

6. The pixel of claim 1, wherein the pixel transistor structure includes plural MOS transistors connected in series, each transistor having a respective gate coupled to a respective source.

7. The pixel of claim 1, wherein the pixel transistor structure includes plural MOS transistors connected in series, each transistor having a respective gate coupled to a respective predetermined voltage.

8. The pixel of claim 1 wherein the photon detecting element includes a photo-diode.

9. The pixel of claim 1, wherein the photon detecting element includes a photo-gate.

10. A method of using the pixel of claim 1 comprising steps of:
   clocking the reset transistor momentarily into an "on" state; and
   sampling a voltage at the output node.

11. A method of using the pixel of claim 1 comprising steps of:
   increasing an offset between the second predetermined voltage and the first predetermined voltage while an increased linear response region is required; and
   decreasing an offset between the second predetermined voltage and the first predetermined voltage while a decreased linear response region is required.

12. A pixel comprising:
   a photon detecting element coupled between a node and a ground;
   a transistor structure coupled between the node and a first predetermined voltage to provide a logarithmic response region, the transistor structure including plural MOS transistors connected in series.

13. The pixel of claim 12, wherein each of the plural transistors connected in series has a respective gate coupled to a respective drain.

14. The pixel of claim 12, wherein each of the plural transistors connected in series has a respective gate coupled to a respective source.

15. The pixel of claim 12, wherein each of the plural transistors connected in series has a respective gate coupled to a respective predetermined voltage.

* * * * *